United States Patent [19]

Streit et al.

[11] 4,319,762

[45] Mar. 16, 1982

[54] STORAGE AND DISPOSAL BIN FOR WASTE FATTY MATERIALS

[76] Inventors: Philip N. Streit, Rte. #1, Box 76B50 Opelousas, LA; Lyle E. Leininger, Rte. 8 Box 537, Lakeside, Tex. 76108

[21] Appl. No.: 157,881

[22] Filed: Jun. 9, 1980

[51] Int. Cl.[3] .......................... B01D 35/02; B62B 3/02

[52] U.S. Cl. .................................. 280/79.2; 210/464; 220/1 C; 220/335

[58] Field of Search ...................... 280/79.1 R, 79.1 A, 280/79.2, 47.26; 296/101; 232/43.1, 1 R; 220/71, 335, 210, 324, 325, 73, 1 C; 210/163, 164, 167, 238, 244, 462, 464, 473; 184/1.5; 414/608

[56] References Cited

U.S. PATENT DOCUMENTS

| | | | |
|---|---|---|---|
| 806,885 | 12/1905 | Focht | 280/47.26 |
| 933,070 | 9/1909 | Gleason | 220/335 X |
| 1,568,830 | 1/1926 | Gunderson | 220/1 C |
| 1,683,788 | 9/1928 | Mauser | 220/71 |
| 1,831,687 | 11/1931 | Ross | 232/43.1 |
| 2,376,874 | 5/1945 | Henry | 184/1.5 |
| 2,450,520 | 10/1948 | Maddux | 210/244 |
| 3,515,423 | 6/1970 | De Smidt | 220/210 X |
| 3,685,852 | 8/1972 | Wendorf et al. | 280/79.2 |

FOREIGN PATENT DOCUMENTS

| | | | |
|---|---|---|---|
| 600723 | 6/1960 | Canada | 220/235 |

*Primary Examiner*—John A. Pekar

*Attorney, Agent, or Firm*—Neal J. Mosely

[57] ABSTRACT

A sanitary apparatus for storage and transportation of waste fatty materials for reprocessing consists of a sealed storage bin of novel and sanitary construction. The unit consists of a fluid tight box shaped bin having an open top and tapering downward toward a closed bottom. The bin is reinforced with a rectangular angle iron frame at the bottom in which are positioned casters for support and ease of lateral movement. The bin is reinforced by a rectangular channel frame about half way up its height. The top of the bin is surrounded by a rectangular angle iron flange which supports a cover having a base flange fitting the top flange on the bin. The cover flange includes an inwardly facing channel fitting the rear flange on the top of the bin and also has locating pins which extend through mating holes in the top flange of the bin. The top part of the cover slopes downward toward the front and has a lid hinged thereon which has a pull latch and is spring loaded toward open position. The opening closed by the lid has a perforate plate or screen secured inside to screen out foreign objects in the fatty waste being poured into the bin. The locating pins on the cover have lateral holes for receiving locks to secure the cover against unauthorized removal.

11 Claims, 9 Drawing Figures fig.3
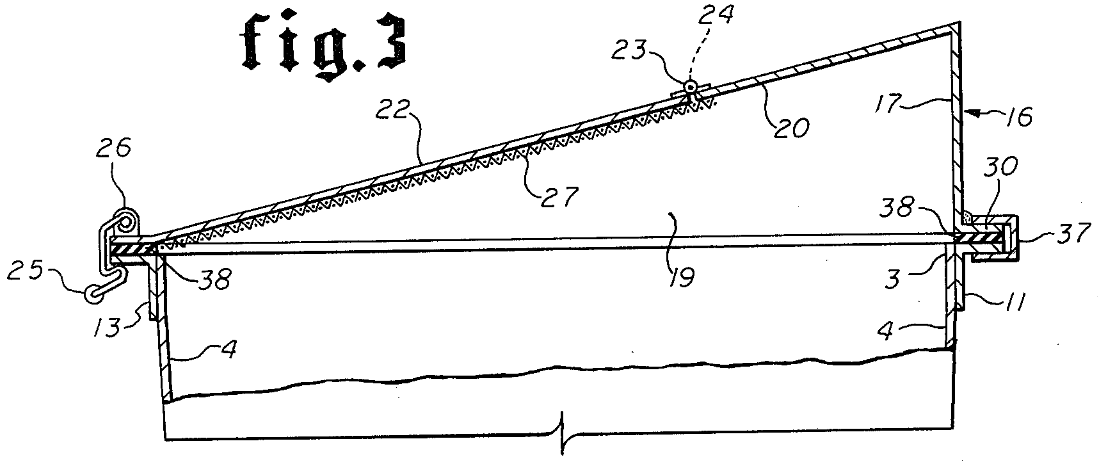
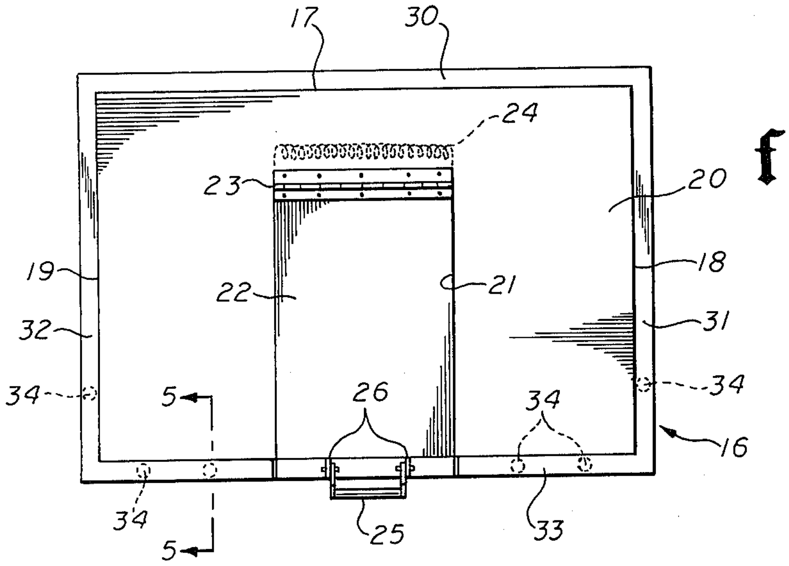
fig.4
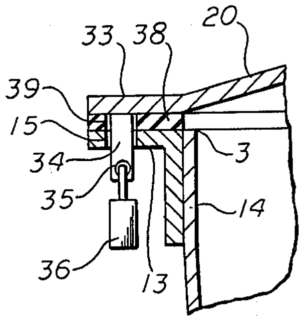
fig.5
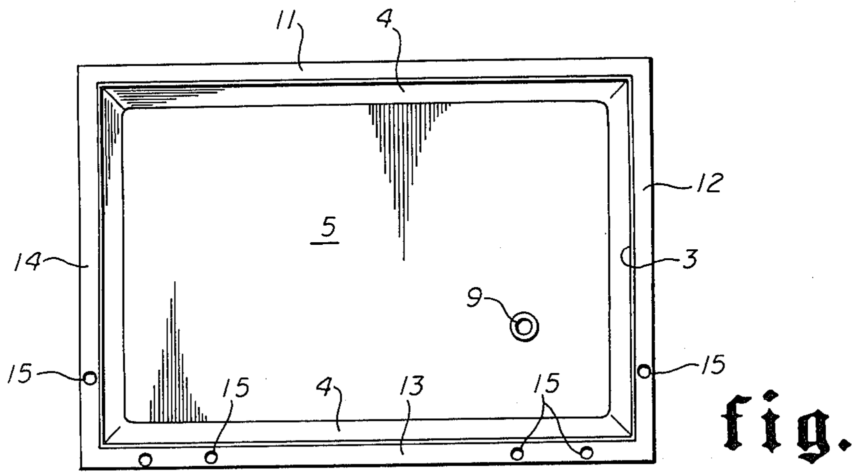
fig.6

STORAGE AND DISPOSAL BIN FOR WASTE FATTY MATERIALS

BACKGROUND OF THE INVENTION

1. Field of the Invention

This invention relates to new and useful improvements in storage apparatus for handling waste fatty materials, such as fats, greases and oils, from restaurants and other food handling facilities.

2. Brief Description of the Prior Art

It is well known in the prior art to collect waste fats, oils and greases from restaurants and other food handling facilities in drums or barrels. Such drums or barrels are picked up by trucks periodically and carried to rendering or other processing plants for reclaiming the fatty materials. These barrels present many health and safety hazards. Persons who carry the hot greases or fats to the barrels usually have difficulty pouring into them and silverware and utensils which may have fallen in to such fatty materials may be poured into the barrels and lost. The present apparatus for collection of waste fatty materials has the further disadvantage that rain water and foreign matter is often collected in the open barrels and the apparatus is not sanitary in that the barrels and drums attract pests of various types creating a public health problem. The present practice is also unsafe in that the process of emptying hot grease, fats and oils has created spilling and slopping hazards for those that handle the materials. Another major problem is the theft of the waste grease barrels. There is no convenient way to identify them and companies now in the waste grease pick up and rendering business consider theft of the barrels to be one of their greatest problems. In handling waste grease barrels, a lid is secured on top by a snap ring and the barrels are rolled on their sides. This often results in spilling or loss of the entire contents when the lids occasionally come loose.

Prior art patents which are somewhat relevant to certain features of this invention are discussed briefly below.

Ross U.S. Pat. No. 1,831,687 discloses a sheet metal garbage or trash container having a pedal operated door.

Long U.S. Pat. No. 1,554,589 discloses a portable oil drain pan having a depression in one portion and a strainer for recovery of contaminates.

SUMMARY OF THE INVENTION

One of the objects of this invention is to provide a new and improved apparatus for the storage and collection of fatty materials derived from edible fats for transportation to a place of reprocessing.

Another object of the invention is to provide an improved waste fat handling apparatus which is sanitary and makes easy the storage and transportation of waste fatty materials.

Still another object of the invention is to provide an improved waste fat handling apparatus including a storage unit or bin having easy access for introduction of waste fatty materials and means for straining foreign materials from the fatty materials being collected.

Another object of the invention is to provide an improved apparatus for handling waste fatty materials including a storage unit or bin having a locked cover with a spring opened lid and having a strainer for catching foreign matter and a dip stick for evaluating the contents.

Another object of the invention is to provide an improved apparatus for handling waste fatty materials which is simple and inexpensive to manufacture and assemble and inexpensive to operate, and provides for improved sanitary conditions in the storage and handling of waste fats, greases and oils in restaurants and other food handling establishments.

Other objects of this invention will become apparent throughout the specification and claims as hereinafter related.

A sanitary apparatus for collection and storage of waste fatty materials which accomplishes the foregoing objects is described more fully hereinafter. The apparatus includes a sanitary storage unit or bin of sealed, fluid tight construction. The unit consists of a fluid tight box shaped bin having an open top and tapering downward toward a closed bottom. The bin is reinforced with a rectangular angle iron frame at the bottom in which are positioned casters for support and ease of lateral movement. The bin is reinforced by a rectangular channel frame about half way up its height. The top of the bin is surrounded by a rectangular angle iron flange which supports a cover having a base flange fitting the top flange on the bin. The cover flange includes an inwardly facing channel fitting the rear flange on the top of the bin and also has locating pins which extend through mating holes in the top flange of the bin. The top part of the cover slopes downward toward the front and has a lid hinged thereon which has a pull latch and is spring loaded toward open position. The opening closed by the lid has a perforate plate or screen secured inside to screen out foreign objects in the fatty waste being poured into the bin. The locating pins on the cover have lateral holes for receiving locks to secure the cover against unauthorized removal.

BRIEF DESCRIPTION OF THE DRAWINGS

FIG. 3 is a sectional view taken on the line 3—3 of FIG. 1 of the top portion or cover of the storage unit.

FIG. 4 is a plan view of the cover unit for the storage bin shown in FIG. 1.

FIG. 5 is a detail sectional view taken on the line 5—5 of FIG. 4 showing the pins for locating the cover on the storage unit and the locking arrangement for the cover.

FIG. 6 is a plan view of the unit shown in FIG. 2, the cover being removed.

DESCRIPTION OF THE PREFERRED EMBODIMENTS

Figure 1:
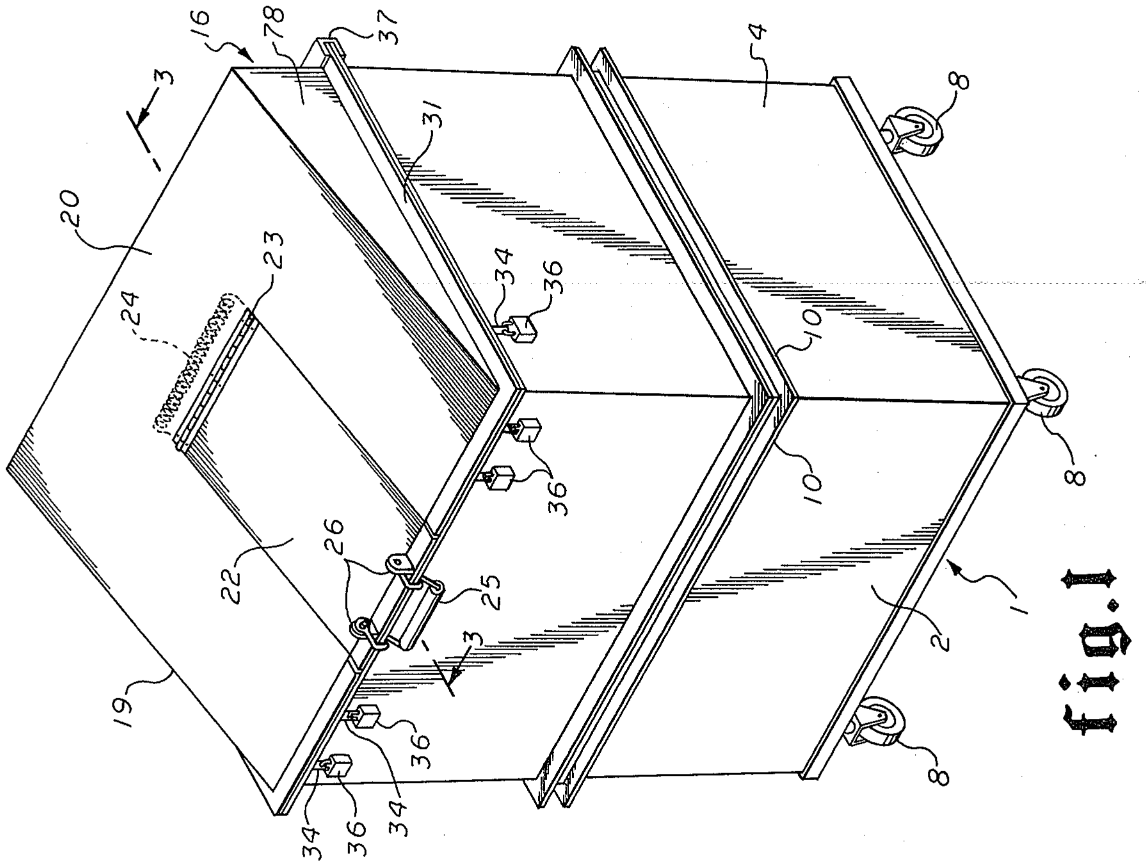
FIG. 1 is an isometric view of a preferred embodiment of this invention comprising an improved storage unit or bin for storage and handling of waste fatty materials.

In the accompanying drawings, there is shown a novel storage apparatus for handling waste fatty materials in a sanitary manner. As noted above, waste fatty materials, such as greases, fats and oils, from restaurants and other food handling facilities are stored in drums or barrels, usually at the rear door or outside the establishment until picked up for transportation to a processing or rendering plant. This practice is not sanitary in that the drums and barrels tend to attract pests, such as rodents, small animals, insects, etc. and is responsible for a substantial public health problem. The present practice of handling waste fatty materials is also unsafe in that the process of emptying hot fats or greases or oils into drums or barrels is inherently hazardous.

In the accompanying drawings, there is shown a preferred embodiment of an improved apparatus for storage of waste fatty materials in preparation for transportation to a plant for rendering or processing. This apparatus comprises an improved storage unit or bin for handling fluid fatty materials. The storage unit or bin is of novel construction and includes a variety of features which contribute to the sanitary handling of waste fatty materials.

Referring to the drawings by numerals of reference, there is shown a novel storage unit or bin 1 which is designed especially for use in handling waste fatty materials. The storage unit or bin 1 may be of any suitable sanitary material of construction and would ordinarily be of stainless steel for handling waste fatty materials from restaurants, although other suitable materials of construction, such as aluminum, fiberglass or the like could be used.

Figure 2:
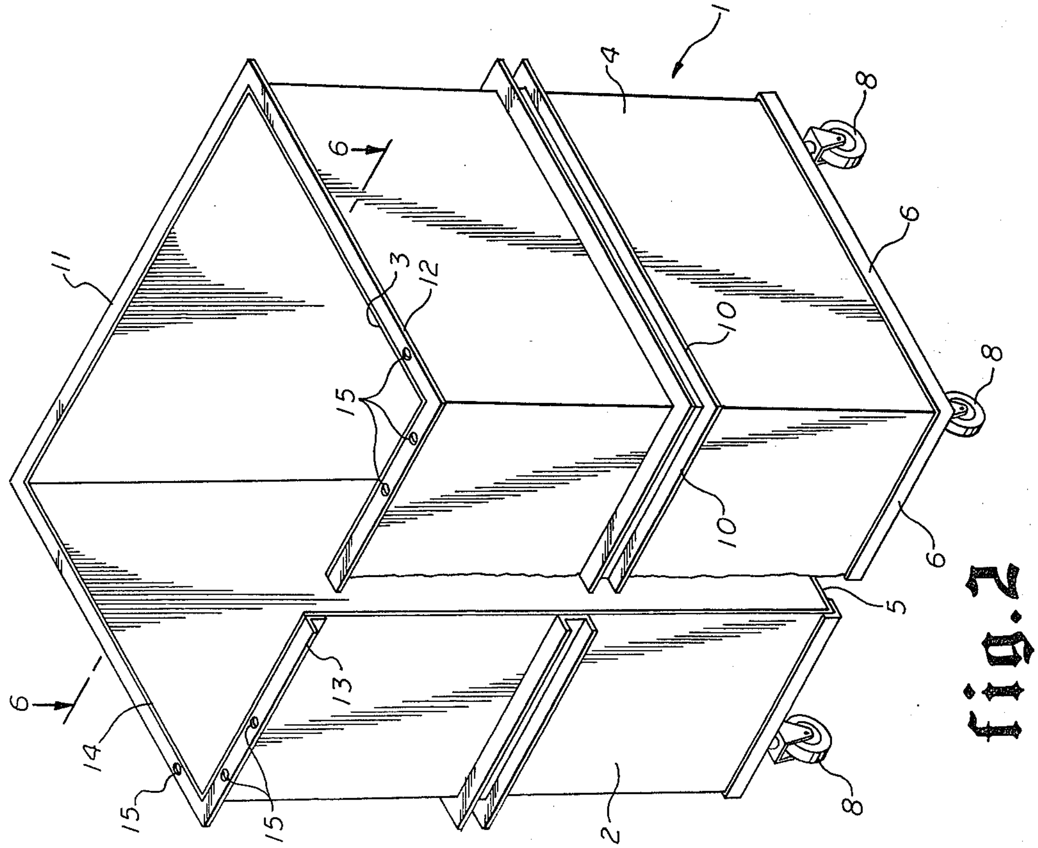
FIG. 2 is an isometric view of the storage unit or bin shown in FIG. 1 with the cover removed and shown partially in broken section.

Storage bin 1 consists of a fluid tight box shaped bin 2 having an open top 3 (see FIGS. 2 and 6) and side walls 4 tapering downward to a relatively flat bottom 5. The side walls 4 taper downward so that the area of the top opening 3 is somewhat larger than the area of the bottom wall 5. This makes it easier to dump the contents.

Bottom wall 5 of storage bin 2 is reinforced by a rectangular frame of angle iron 6, the individual pieces of which are welded together and secured to the bottom of the bin. Metal straps 7 extend diagonally at the corners of angle iron frame 6 and provide a mounting base for casters 8 which support the bin for rolling movement on the floor or ground on which the unit is supported. The bottom wall 5 is also provided with an outlet opening 9 having a valve, not shown, which can be opened for draining light fluids or for allowing air to enter when the unit is inverted for pouring out the contents.

The side walls 4 of bin 2 are reinforced by a rectangular framework of channels 10 which are welded together at the corners and secured on the walls of bin 2 for reinforcement. The channel iron band 10 provides as a guard or reinforcement to protect the sides of the storage unit or bin 2 and also is of sufficient strength to be used for lifting the unit. The band of channel iron members 10 is preferably located slightly above the center so that the center of gravity of the unit will lie below this reinforcing band when the unit is picked up.

At the open top 3 of storage bin 2, there is provided a rectangular frame consisting of angle irons 11, 12, 13 and 14 which are welded together at the corners and secured on the walls 4 of the storage bin.

In the various figures, the front of the unit is considered to be the part along which angle iron 13 extends while the rear of the unit is defined by angle iron 11. Angle irons 12 and 14 are provided with holes or apertures 15 and similar apertures are found in the front angle iron 13. These holes or apertures 15 are provided to receive locating or locking pins from the cover units which will be subsequently described.

The open top 3 of storage bin 2 is closed by cover 16 (see FIGS. 1 and 3) which is removably secured in place. Cover 16 has a shape of a right triangular prism and has its shorter wall 17 positioned as substantially a continuation of the rear wall 4 of the storage bin. Side walls 18 and 19 of cover 16 are aligned with and form extensions of the side walls 4 of the storage bin. The upper wall 20 of cover 16 slopes downward toward the front to substantially the level of front flange 13 on the top 3 of the storage bin.

Figure 7:
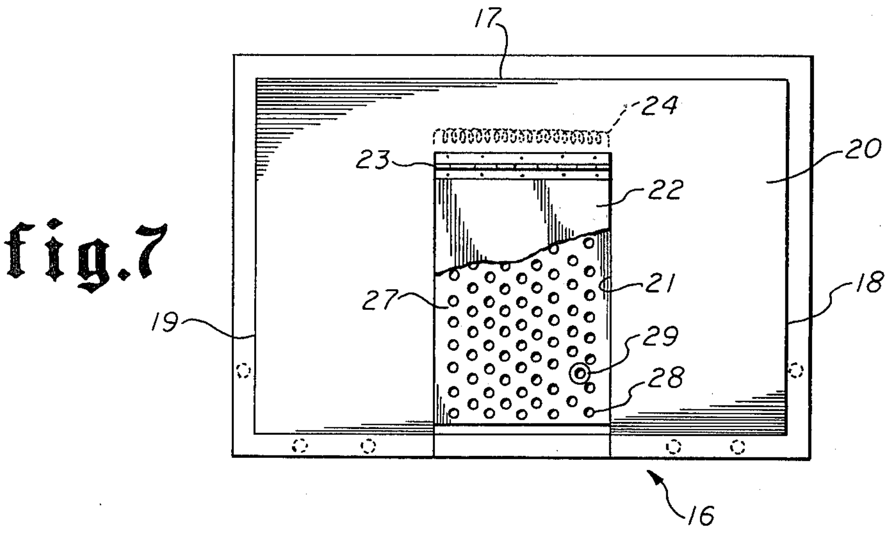
FIG. 7 is a plan view of the cover unit similar to FIG. 4 with the lid partially broken away to illustrate the strainer.
Figure 8:
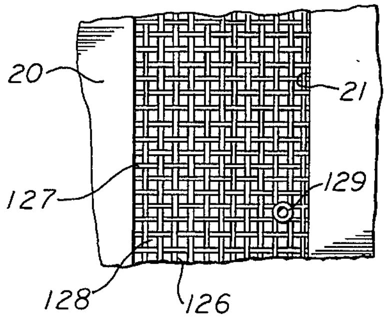
FIG. 8 is a detail view of an alternate form of strainer.
Figure 9:
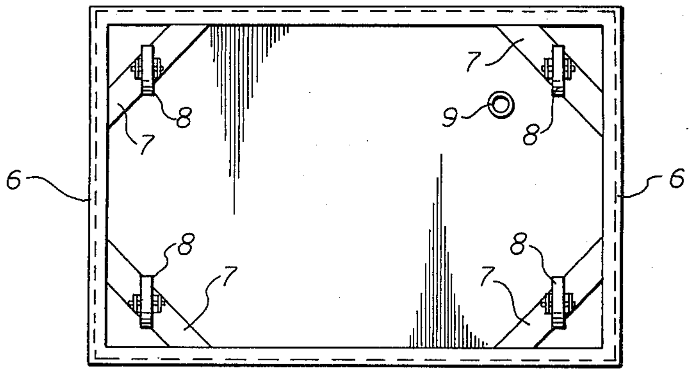
FIG. 9 is a bottom view of the storage unit shown in FIG. 1 showing the casters and the drain.

Cover 16 has a centrally located opening 21 which is closed by cover 22 and supported by spring loaded hinge 23 on sloping wall 20. Spring 24 in dotted line is a schematic for a spring loaded hinge urging lid 22 toward an open position. Spring 24 in hinge 23 is of sufficient strength to lift lid 22 to a fully opened position when the lid is unlatched. Lid 22 is provided with a pull latch 25 at its front end which is supported on hinge brackets 26 and arranged to hook over front flange 13, as seen in FIG. 3. Lid opening 21 is covered on the inside by strainer 27 which is secured, preferably by welding, to the inside of sloping wall 20. In FIGS. 7 and 8 of the drawing there are shown two different embodiments of strainer 27.

In FIG. 7, strainer 27 is a perforated sheet metal plate having holes or perforations 28 of a size permitting fatty materials to be poured into storage bin 2 while catching or retaining large pieces of foreign matter, such as silverware or utensils which may have been dropped into the fats in kitchen. Strainer 27 is also provided with an opening 29 to receive a dip stick for measuring the contents of the storage bin.

In FIG. 8, an alternate strainer 127 is shown which consists of a very course screen formed of thin rods 126 which are welded together and to cover wall 20. Screen 127 has openings 128 of desired size and opening 129 for receiving a dip stick in a manner similar to opening 29 in the screen 27 shown in FIG. 8.

Cover 16 is provided with peripheral flanges 30, in the back, 31 and 32 on the sides and 33 in the front. Flanges 31, 32 and 33 have downwardly extending pins 34 secured thereon which are positioned to match with holes 15 in the flanges extending around the top 3 of the storage bin. Pins 34 serve to locate cover 16 on the open top 3 of the storage bin and are provided with laterally extending holes 35 which receive locks 36, as seen in FIGS. 1 and 5.

At the rear of cover 16, an inwardly facing channel 37 is secured on rear wall 17 and flange 30 and is arranged to hook over rear flange 11 on the top 3 of the storage bin for securing the cover in place. The unit is also provided with a gasket 38 which is of a size and shape fitting the peripheral flange consisting of flanges 11, 12, 13 and 14 on the top 3 of the storage bin. Gasket 38 is provided with holes or apertures 39 aligned with holes 15 in flanges 12, 13 and 14 to receive locating pins 34 on cover 16.

OPERATION

The operation and function of this apparatus should be generally apparent from the description of its construction. However, a more thorough description of operation will be given to facilitate a more thorough understanding of the invention and its advantages over the prior art.

This apparatus is designed for convenient storage and handling of waste fats, oils and greases from restaurants and other food handling or processing facilities. The storage bin is designed for convenient access and is sealed to protect the contents against infestation with insects, rodents, small animals, etc. The unit is also designed for ease of filling and ease of emptying.

Storage unit or bin 2 is provided with spring loaded door or lid 22 which opens under the influence of spring 24 on hinge 23 whenever the pull latch 25 is pulled. The container of waste fatty material is then emptied into storage bin 2 by being poured through opening 21 in cover 16 through strainer 27 or 127 which will retain larger contaminating foreign material, particularly silverware or utensils which may have been dropped into the fat. The storage unit is preferably of a solid stamped or formed piece of sheet metal, such as steel, stainless steel, aluminum or the like or of a tough plastic, such as fiberglass. It is preferably formed as a one piece unit although it may be formed from separate pieces and secured together at the edges provided that a smooth seem is formed and there are no projections extending inside the bin. The unit tapers from the open top 3 to the bottom 5 so that it can be emptied by being turned upside down after the cover is removed. The unit is mounted on casters 8 which provide for ease of movement even when it is fully filled. This is important, since the unit may weigh several hundred pounds when filled with waste fatty material.

The storage unit cover 16 is preferably formed as a one piece unit with peripherally extending flanges. The upper wall 20 of cover 16 is sloped from the rear to the front to allow for run off of rain water. At the rear of cover 16 the inwardly facing channel 37 is arranged to slip over the angle iron flange 11 at the rear of the top opening 3 of the storage bin. When the cover is being assembled on the storage bin the gasket 38 is placed in position and cover 16 is positioned with flange 30 over lying gasket 38 at the rear and channel 37 hooked over angle iron flange 11 as previously noted. As the cover 16 is lowered into position toward the front of the unit the locating pins 34 pass through holes 39 in gasket 38 and through holes 15 in flanges 12, 13 and 14 toward the front of the top opening 3 from the storage bin. Locating pins 39 locate the cover 16 acurately and securely on the open top of the storage bin and when locks 36 are secured in place the cover 16 may not be removed by unauthorized personnel.

The door or lid 22 on the upper sloping wall 20 of cover 16 is preferably sealed by side gaskets, which are not shown. Alternatively, if desired, door or lid 22 can be made slightly larger than opening 21 in sloping wall 20 and a sealing gasket placed along the line of contact between the door or lid 22 and the opening being closed. In either case, the lid or door 22 provides a sanitary fluid tight seal preventing flies, animals and rodents from easy access to the inside. When the door is tightly closed by having the latch 25 hooked over front flange 13, the unit is protected against spills of fatty materials during movement.

This unit is designed to provide sanitary storage for waste fatty materials from restaurants or similar food processing or food handling establishments. It can be kept outside and it is of a size and shape and construction which prevents easy access by thieves or other unauthorized persons. The strainer 27 has an opening 29, as previously described, for access by a sample probe or dip stick so that the contents can be measured and checked with a testing instrument.

This storage bin or unit is picked up as a unit for transportation by a truck to the fat processing or rendering plant. The unit can be moved easily on the pivoted casters and can be lifted by a forklift or by any other suitable lifting device, such as a lifting gate on the rear of a truck. When the storage unit or bin is taken to the waste fat rendering plant, the cover 16 is removed by first removing locks 36. The bin is then picked up and inverted and the contents poured out. Where the contents are particularly thick or viscous, the valve (not shown) which closes the bottom drain hole 9 is opened to allow air to enter to facilitate the removal of the contents from the storage bin. Also, if desired, a steam hose can be applied to drain hole 9 to assist in emptying the contents from the storage bin.

While this invention has been described fully and completely with special emphasis upon a singled preferred embodiment, it should be understood that within the scope of the appended claims the invention may be practiced otherwise than as specifically described herein.

We claim:

1. A sanitary apparatus for storage and transportation of waste fatty materials for reprocessing comprising a fluid tight box shaped bin having an open top and tapering downward to a closed bottom, said bin being reinforced around periphery of the bottom and having a plurality of casters supporting the same for rolling movement on the floor or ground, a removable cover, having an access opening, fitting tightly over the open top of said bin and locked thereto, preventing unauthorized removal, a lid hinged to said cover closing said access opening and spring loaded toward a fully open position, a pull latch positioned to secure said lid in closed position and operable by pulling to permit said lid to spring open, and a perforate plate or screen secured on the inner surface of said cover covering the inside of said access opening.

2. An apparatus according to claim 1 in which said bin includes a reinforcing flange extending around the top thereof, said flange having a plurality of holes therein, said cover having a reinforcing flange around the periphery thereof with downwardly extending pins secured thereon in spaced relation to fit the holes in said first named flange to locate said cover in position on the top of said bin.

3. An apparatus according to claim 2 in which said locating pins are constructed to receive means for locking said cover to the top of said bin.

4. An apparatus according to claim 3 in which said locating pins each have laterally extending holes therein for receiving locking devices.

5. An apparatus according to claims 2, 3 or 4 in which the reinforcing flange along the back of said cover includes an inwardly facing channel which fits over the rear flange on said bin when said locating pins are positioned in said flange holes.

6. An apparatus according to claims 2, 3 or 4 in which said cover has the shape of a right triangular prism with the shortest wall an extension of the rear wall of said bin and a top sloping extending to the front of said bin with said lid positioned therein.

7. An apparatus according to claim 2 in which said bin has reinforcing channel members surrounding the mid portion thereof.

8. An apparatus according to claim 1 in which the reinforcement around the bottom comprises a rectangular framework of angle iron construction, and said casters being mounted in said angle iron framework.

9. An apparatus according to claim 1 in which said bottom reinforcement comprises a framework of angle iron with said casters mounted therein, said bin has a framework of channel members extending around the mid portion thereof, a reinforcing flange extending around the top of said bin and having a plurality of holes therein, said cover having the shape of a right triangular prism with the shortest wall being an extension of the rear wall of said bin and having a top wall sloping toward the front with said lid hinged thereon, a reinforcing flange extending around the base of said cover including an inwardly facing channel adapted to fit over the rear flange on the top of said bin and having a plurality of downwardly extending pins aligned with the holes in said first named flange and operable to fit therein to locate said cover on the top of said bin, and said pins each having holes extending laterally therethrough for receiving locks securing said cover against unauthorized removal.

10. An apparatus according to claim 1 in which said perforate plate or screen includes an opening for insertion of a dip stick for evaluating the contents of said bin.

11. An apparatus according to claim 2 in which a sealing gasket is included and positioned between said first named and said second named flanges to seal against contamination and against leakage during handling.

* * * * *